(12) United States Patent
Chen et al.

(10) Patent No.: US 7,854,482 B2
(45) Date of Patent: Dec. 21, 2010

(54) SAFETY GUARD MOUNTING/DISMOUNTING DEVICE FOR A BABY SEAT

(75) Inventors: Shun-Min Chen, Taipei (TW); Junxu Jin, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 532 days.

(21) Appl. No.: 11/806,710

(22) Filed: Jun. 4, 2007

(65) Prior Publication Data
US 2008/0169697 A1 Jul. 17, 2008

(30) Foreign Application Priority Data
Jan. 15, 2007 (CN) .................... 2007 2 0002203 U

(51) Int. Cl.
*B62B 7/06* (2006.01)
(52) U.S. Cl. .................... 297/487; 297/488; 280/47.38
(58) Field of Classification Search ................. 297/487, 297/488; 280/47.38, 648, 658; 403/93, 95, 403/109.2, 109.3
See application file for complete search history.

(56) References Cited
U.S. PATENT DOCUMENTS

| | | | | |
|---|---|---|---|---|
| 2,184,881 A | * | 12/1939 | Martinet | ........................ 285/7 |
| 4,669,755 A | * | 6/1987 | Harris et al. | .................... 285/7 |
| 4,679,806 A | | 7/1987 | Gingline | |
| 5,123,767 A | | 6/1992 | Ishikura et al. | |
| 5,462,380 A | * | 10/1995 | Peek et al. | .................. 403/329 |
| 5,604,985 A | * | 2/1997 | Andis et al. | .............. 403/109.8 |
| 5,607,203 A | * | 3/1997 | Sedlack | .................. 297/256.15 |
| 6,179,321 B1 | * | 1/2001 | Sun | ........................... 280/658 |
| 6,267,404 B1 | * | 7/2001 | Yang et al. | ............... 280/47.38 |
| 6,702,332 B2 | * | 3/2004 | Young et al. | .................... 285/7 |
| 2002/0158445 A1 | | 10/2002 | Hsia | |
| 2003/0071442 A1 | | 4/2003 | Hsia | |
| 2003/0098604 A1 | * | 5/2003 | Lan | ........................... 297/487 |
| 2007/0257472 A1 | | 11/2007 | Hartenstine et al. | |

FOREIGN PATENT DOCUMENTS

GB 2 352 691 A 2/2000

* cited by examiner

*Primary Examiner*—Peter R. Brown
(74) *Attorney, Agent, or Firm*—Bacon & Thomas, PLLC

(57) ABSTRACT

A safety guard mounting/dismounting device for a baby seat is provided. The safety guard mounting/dismounting device comprises a mounting seat fixed to leg tubes of the baby seat, a connecting member whose one end being fixed to the safety guard and the other end being inserted into the leg tube of the baby seat, and an engaging assembly disposed in the connecting member which includes an engaging device and a restoring spring, wherein the engaging device includes a hook like portion which is movable between an engaging position where it may engage with the leg tube and a disengaging position, and the restoring spring is arranged such that it may bias the hook like portion of the engaging device toward the engaging position.

5 Claims, 8 Drawing Sheets

SAFETY GUARD MOUNTING/DISMOUNTING DEVICE FOR A BABY SEAT

FIELD OF THE INVENTION

The present invention relates generally to a safety guard of a baby seat, and more specifically to a safety guard mounting/dismounting device for a baby seat.

BACKGROUND OF THE INVENTION

Baby seats are well-known children's appliances and are already commercially available. Usually a safety guard and/or a tray are provided in front of the baby seat in order to prevent the baby from falling out and/or to provide a space for placing food/drinks. In addition, to facilitate accessing the baby seat the safety guard and/or the tray are designed in a removable type. For instance, U.S. Pat. No. 5,004,253 has disclosed a removable safety guard for a baby carriage which is removably coupled to the frame of the baby carriage through a coupling means (as the structure illustrated in FIG. 3 of this patent); the US patent application publication No. 2002/0175498 A1 has disclosed a partially removable front guard of a stroller which is connected to the frame of the stroller by way of a connecting member (as the structure illustrated in FIG. 2 of this patent application); and the US patent application publication No. 2002/0175498 A1 also disclosed a partially removable front guard of a baby seat. Although removable safety guards for a baby seat/stroller already exist, the connecting members between these existing safety guards and the baby seats/strollers possess a drawback of lacking sufficient mechanical strength which causes a problem that the connecting member will snap and fall out of the safety guard or the frame and unable to be used. In addition, some of the existing removable safety guard designs require both hands to operate and this will cause great inconvenience in a situation that one hand of the user is occupied (for instance, one hand of the user is holding a baby and thus only one hand is left to operate the removable safety guard). Therefore, there exists a need for a safety guard mounting/dismounting device for a baby seat which has sufficient mechanical strength and easy to operate.

SUMMARY OF THE INVENTION

Accordingly, one object of the present invention is to provide a safety guard mounting/dismounting device for a baby seat which is easy to operated and hard to be broken.

To achieve this and other objects, a safety guard mounting/dismounting device for a baby seat according to a first embodiment of the present invention is provided, the baby seat having a leg tube, and a safety guard detachably mounted to the leg tube through the safety guard mounting/dismounting device, the safety guard mounting/dismounting device comprises: an engaging hole formed in a tube wall of the leg tubes; a connecting member including a first coupling portion fixed to the safety guard, a second coupling portion coupled to the leg tubes, and an intermediate portion between the first and the second coupling portions, wherein a recess is formed in the intermediate portion which extends from a place adjacent to the first coupling portion to the second coupling portion; and an engaging device including a engaging member operably disposed in the recess and an elastic element mounted between the engaging member and the connecting member, wherein the engaging member includes a pivoting portion pivotally coupled to the recess at one end adjacent to the first coupling portion and a hook-like portion formed at the other end opposed to the pivoting portion which is pivotally movable between an engaging position and a disengaging position and engages with the engaging hole of the leg tubes when the second coupling portion of the connecting member is coupled to the leg tubes, and the restoring elastic element is arranged such that the hook-like portion is biased toward the engaging position thereby.

According to this embodiment, the safety guard mounting/dismounting device further comprises a mounting seat which includes a hollow connecting portion for installing to the leg tube and a through hole for aligning with the engaging hole of the leg tube. The recess has two enlarged portions which are laterally expanded from the lateral sides of one end of the recess that is adjacent to the first coupling portion, and the pivoting portion of the engaging member includes two ears that are laterally projected from the lateral sides of the engaging member, and these two ears are disposed in the two enlarged portions of the recess. The connecting member includes a cover which covers a portion of the recess that is at the intermediate portion of the connecting member and has two bulges formed at positions corresponding to the two enlarged portions of the recess. The engaging hole of the leg tube has an engaging tongue formed at a portion of its peripheral for engaging with the hook-like portion of the engaging member. The engaging member has a pressing portion and the cover has a through hole through which the pressing portion may project.

According to a second embodiment of the present invention, a safety guard mounting/dismounting device for a baby seat is provided, the baby seat has a supporting frame which includes leg tubes, and a safety guard detachably mounted to the baby seat through the safety guard mounting/dismounting device, the safety guard mounting/dismounting device comprises: an engaging hole formed in a tube wall of the leg tubes; a connecting member includes a first coupling portion fixed to the safety guard and a second coupling portion that can be inserted into the leg tube, wherein an elastic engaging device is formed on the second coupling portion for engaging with the engaging hole of the leg tube; and an operating device mounted on the mounting seat and comprising a button and a restoring elastic element, the button being constructed that it can be moved between a first position at which the elastic member is biased toward to and a second position at which the elastic engaging device is pushed to move from the engaging hole of the leg tube.

According to this embodiment, the mounting seat further comprises a plug member which is a hollow tube member received in the leg tube and has a hole formed in a tube wall corresponding to the engaging hole of the leg tube; and a mounting seat which includes a hollow connecting portion for coupling to the leg tube and a through hole for aligning with the engaging hole of the leg tube. The elastic engaging device of the connecting member includes an elastic arm formed on the tube wall of the second coupling portion of the connecting member, and the cantilever beam type elastic arm comprises a fixed end adjacent to the first coupling portion and a free end opposite to the fixed end at which a protrusion projects laterally. The button includes a head extending to the outside of the mounting seat, a stem that pass through the hole of the mounting seat, and a flange between the head and the stem. The restoring elastic element is a coil spring which is put around the stem portion of the button and disposed between the flange and the mounting seat. The elastic arm comprises a reward inclined guiding face formed at a front end of the protrusion.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now being made to the following description taken in conjunction with the accompanying drawings, wherein.

DETAILED DESCRIPTION OF THE INVENTION

Figure 1:
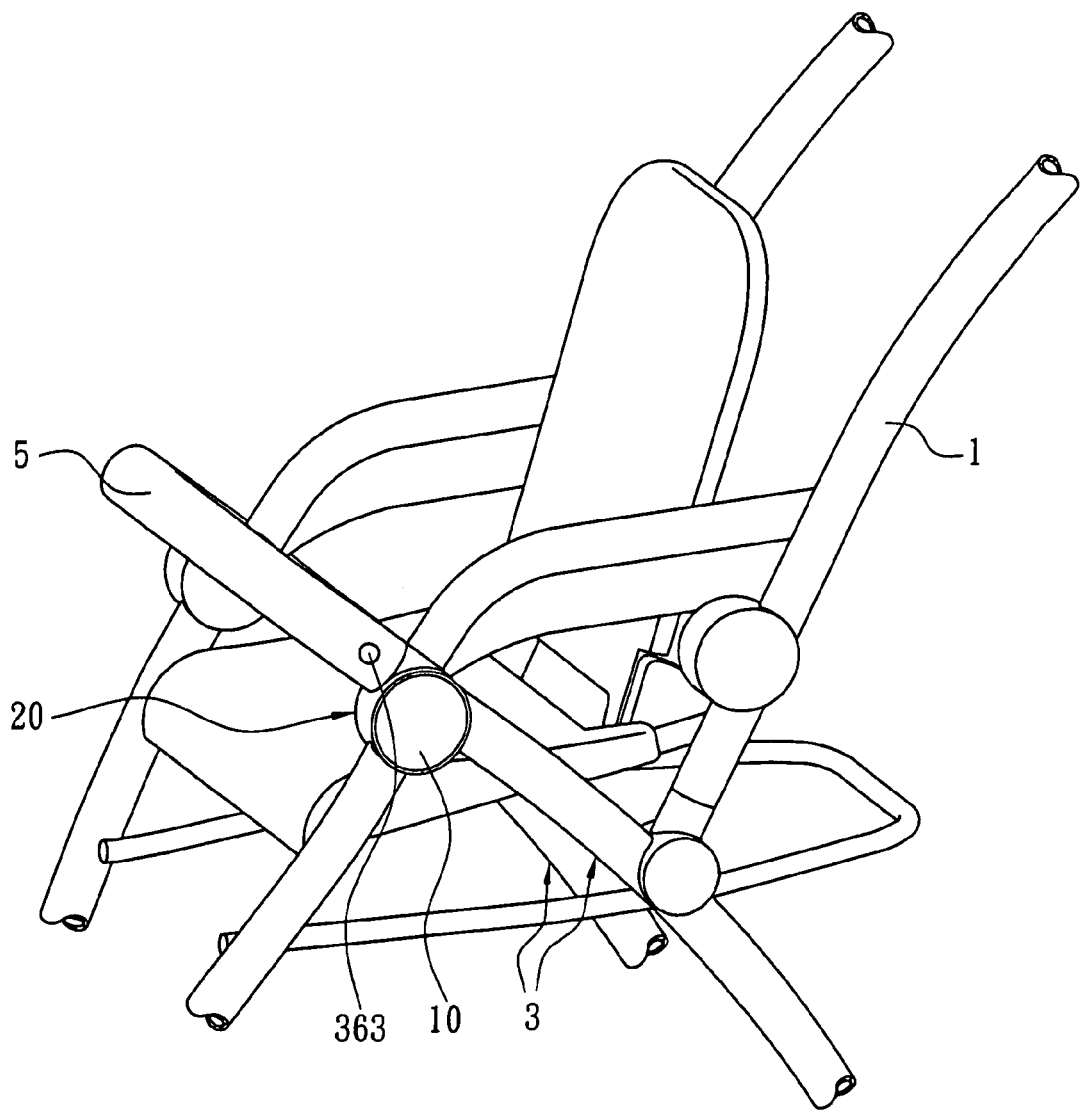
FIG. 1 is a perspective view illustrating a portion of a baby seat which incorporates with a safety guard mounting/dismounting device for a baby seat according to a first embodiment of the present invention.

Referring now to the drawings in which preferred embodiments of the present invention are illustrated to describe the principles of the present invention.

Figure 2:
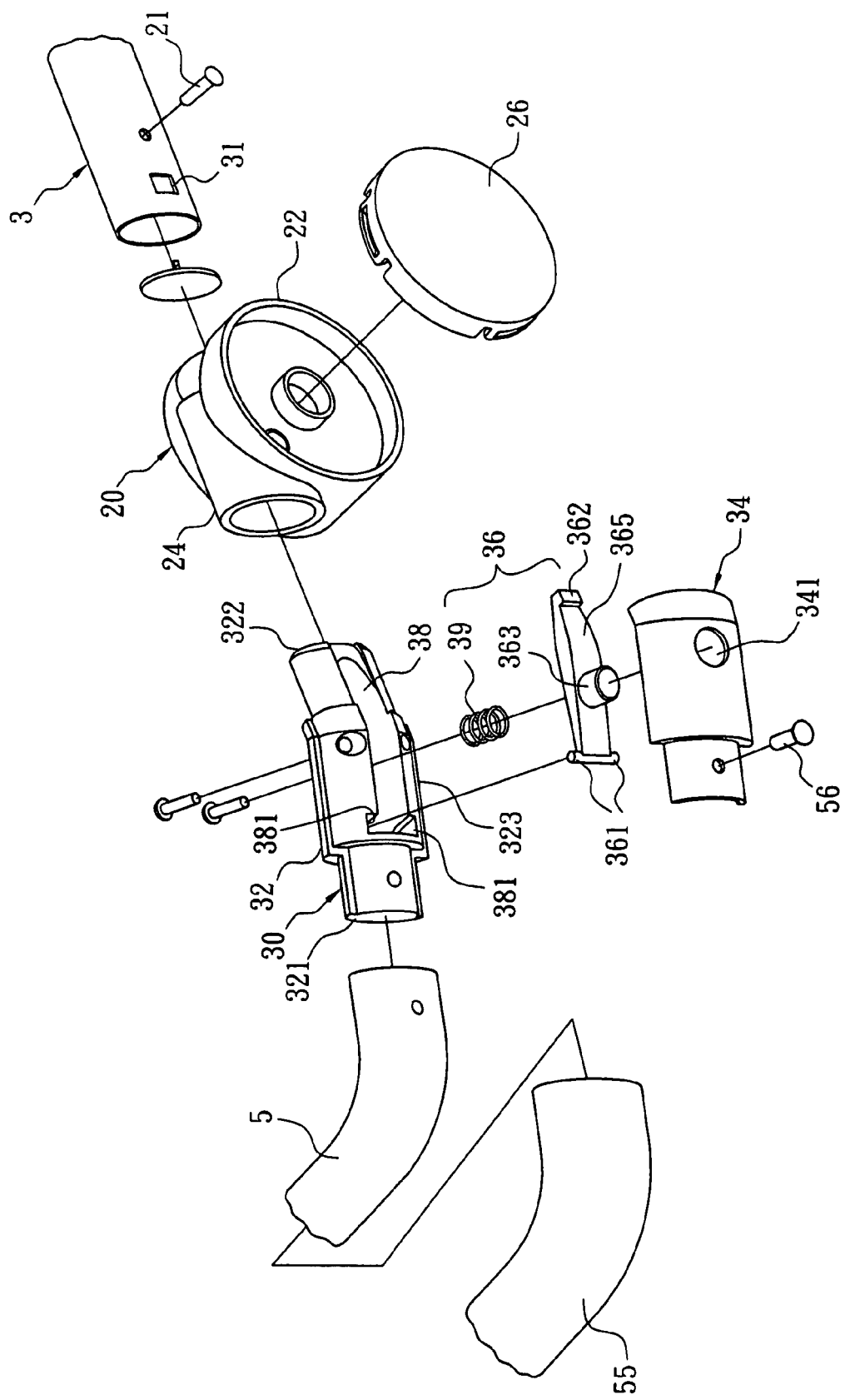
FIG. 2 is an exploded perspective view of the safety guard mounting/dismounting device for a baby seat according to the first embodiment of the present invention.
Figure 3A:
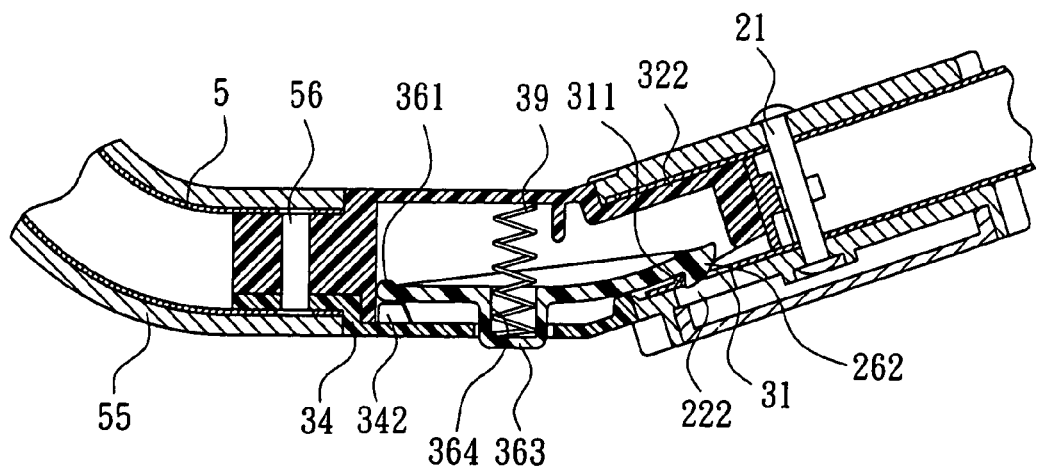
FIGS. 3a and 3b are cross-sectional views illustrating a locked state and an unlocked state of the safety guard mounting/dismounting device according to the first embodiment of the present invention respectively.
Figure 3B:
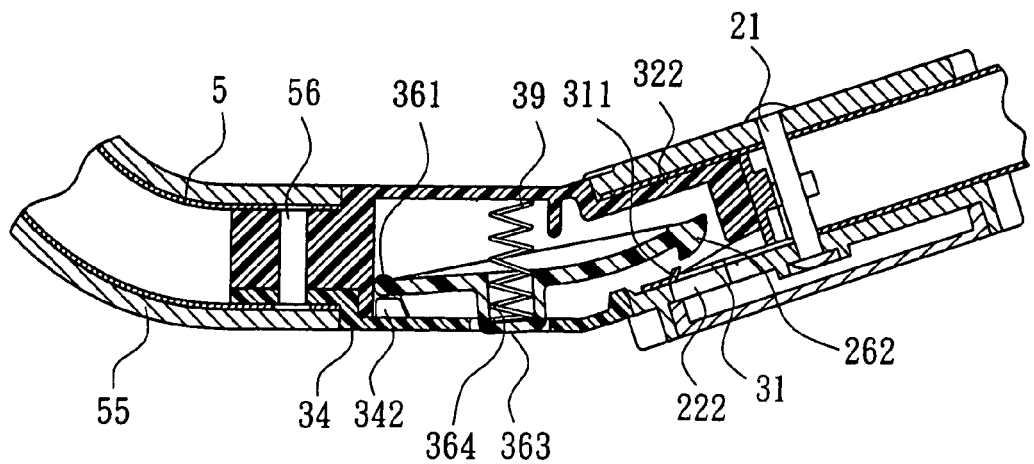
Figure 4:
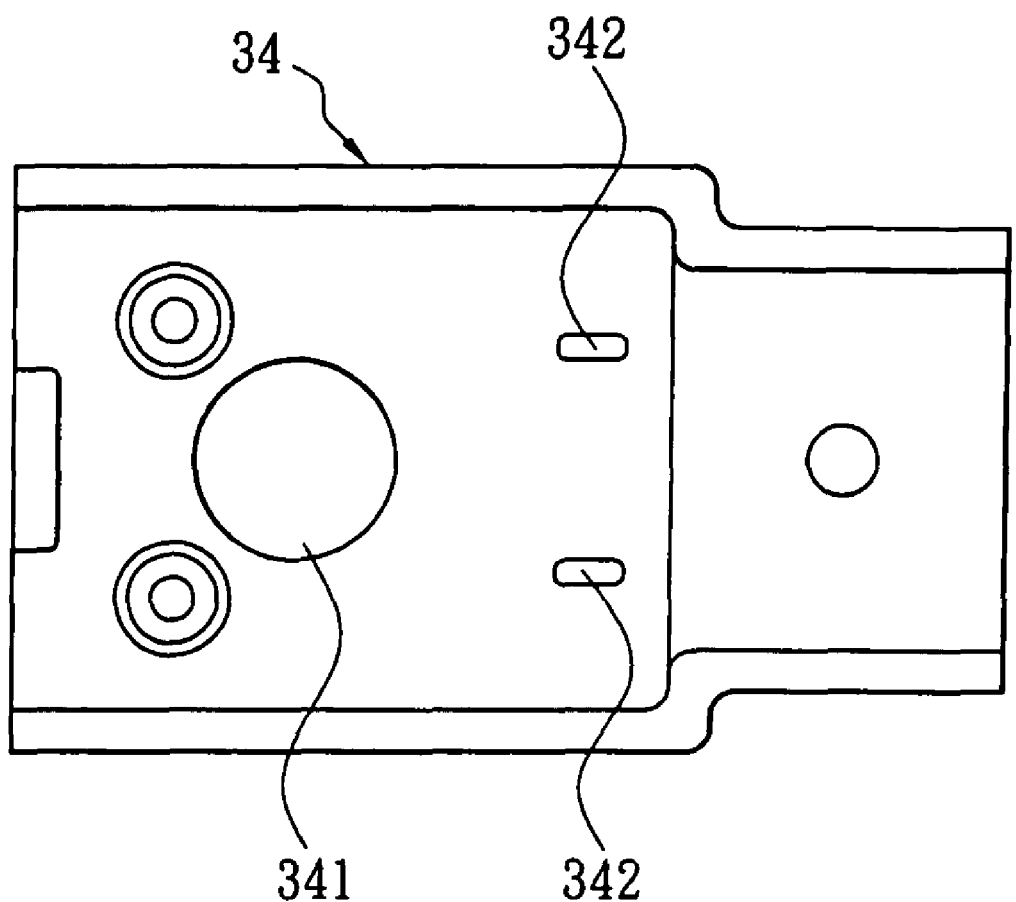
FIG. 4 is a perspective view of a cover of the connecting member of the safety guard mounting/dismounting device according to the first embodiment of the present invention respectively.

FIGS. 1 to 4 are drawings illustrating a safety guard mounting/dismounting device for a baby seat according to a first embodiment of the present invention, wherein FIG. 1 is a perspective view showing a portion of a baby seat 1 incorporating with a safety guard mounting/dismounting device 10 according to this embodiment, FIG. 2 is an exploded perspective view of the safety guard mounting/dismounting device 10, and FIGS. 3a and 3b are cross-sectional views illustrating a locked state and an unlocked state of the safety guard mounting/dismounting device 10 respectively. As shown in FIG. 1, the baby seat 1 includes two rear leg tubes 3 and a safety guard 5 which is coupled to the rear leg tubes 3 through the safety guard mounting/dismounting device of the present invention (not shown). In other embodiments, the safety guard may be a safety member or a tray that is disposed in front of a stroller. As illustrated in FIG. 2, the safety guard mounting/dismounting device 10 mainly comprises a mounting assembly 20 and a connecting assembly 30. In this embodiment, an engaging hole 31 id formed in a tube wall of the rear leg tube 3 and a projecting member 311 (see FIGS. 3a and 3b) is protruded inwardly from a side wall of the engaging hole 31 for enhancing the engaging strength. The mounting assembly 20 includes a mounting seat 22 having a hollow connecting portion 24 for receiving the rear leg tube 3 of the baby seat 1 therein, and a seat cover 26. The mounting seat 22 includes a through hole 222 (see FIGS. 3a and 3b) that is in communication with the connecting portion 24 and align with the engaging hole 31 of the rear leg tube 3. The mounting seat 22 is fixed to the rear leg tube 3 by a fixing member, such as a rivet 21. The seat cover 26 covers an outer side of the mounting seat 22 for covering the rivet 21 and providing a decorative effect.

The safety guard 5 is a hollow tube member and preferably is provided with a safety guard sleeve 55. The connecting assembly 30 mainly comprises a connecting member 32, a cover 34, and an engaging device 36. The connecting member 32 includes a first coupling end 321, a second coupling end 322, and an intermediate portion 323 disposed therebetween, wherein the first and second coupling ends 321, 322 are sized and shaped such that they can be coupled to the safety guard 5 and the rear leg tube 3 respective. The intermediate portion 323 is sized larger than the first and second coupling ends 321, 322 such that when the first and second coupling ends 321, 322 are coupled to the safety guard 5 and rear leg tube 3 by inserting therein respectively, the intermediate portion 323 will not be received in the safety guard 5 and rear leg tube 3. A longitudinal recess 38 is formed on a lateral face of the connecting member 32. The recess 38 extends longitudinally from a position in the intermediate portion 323 adjacent to the first coupling end 321 to the second coupling end 322. Further, the recess 38 has two lateral enlarged portions 381, 381 which are respectively expanded from the lateral sides of the end of the recess that is adjacent to the first coupling portion and have a depth that is smaller than that of the recess 38.

In this embodiment, the engaging device 36 comprises an engaging member 365 which is an elongated member and has two ears 361, 361 projecting laterally from the lateral sides of one end thereof respectively, a hook-like portion 362 projecting outwardly at the other end thereof and having a reward inclined guiding face, and an operating portion 363 formed at a position between the two ends thereof. The operating portion 363 is a hollow protuberance with a closed end that projects outwardly from the surface at which the hook-like portion 362 is formed and forms a chamber 364 (see FIGS. 3a and 3b) in a surface of the engaging member 365 opposing the surface at which the hook-like portion 362 is formed. The engaging member 365 is disposed in the recess 38 of the connecting member 32 by way of placing its two ears 361, 361 in the two lateral enlarged portions 381, 382 of the recess 38 and the chamber 364 of the operating portion 363 is faced the connecting member 32. The engaging device further comprises a restoring elastic element, such as a coil spring 39, disposed between the engaging member 365 and the recess 38 of the connecting member 32 with a portion thereof being accommodated in the chamber 364 of the operating portion 363, as illustrated in FIGS. 3a and 3b.

The cover 34 includes a portion for covering the first coupling end 321 of the connecting member 32, a portion for covering the intermediate portion 323 of the connecting member 32, and a through hole 341 formed at a position correspond to the operating portion 363 of the engaging member 365 to allow the operating portion 363 of the engaging member 365 to pass therethrough. In addition, two bulges 342, 342 are formed on a surface of the cover 34 facing the engaging member 365 at positions corresponding to the two ears 361, 361 of the engaging member 365 for abutting against the two ears 361, 361 when the cover 34 covers the connecting member 32 so as to allow the engaging member 365 to pivot in the recess 38 of the connecting member 32 about the two ears 361, 361, and thus allow the hook-like portion 362 of the engaging member 365 to be moved between an engaging position and disengaging position and be biased toward the engaging position by the spring 39.

After the engaging member 365 being disposed in the recess 38, the first coupling end 321 of the connecting member 32 may be covered with the cover 34. Then, the first coupling end 321 of the connecting member 32 are together inserted in the safety guard 5 and fixed thereto by a fixing member, such as a rivet 56.

In this state, the safety guard 5 with which the connecting assembly 30 is incorporated may be removably mounted to the baby seat 1. Specifically, when the safety guard 5 with which the connecting assembly 30 needs to be coupled to the baby seat 1, user only needs to insert the second coupling end 322 of the connecting assembly 30 into the connecting portion 24 of the mounting assembly 20. At this time, the hook-like portion 362 of the engaging member 365 will pivot into the recess 38 of the connecting member to the disengaging position and compress the restoring spring 39 by the interaction between the inclined guide face of the hook-like portion 362 and the connecting portion 24 and the rear leg tube 3, and when the second coupling end 322 of the connecting assembly 30 is inserted to a position that the hook-like portion 362 of the engaging member 365 align with the engaging hole 31 of the rear leg tube 3, the hook-like portion 362 of the engaging member 365 is pivoted toward the rear leg tube 3 to the engaging position by the restoring force of the spring 39 to engage with the projecting member 311 of the engaging hole 31 of the rear leg tube 3, as shown in FIG. 3a, to thereby mounting the safety guard 5 to the baby seat 1. In a modification of this embodiment, no projecting member 311 is formed at the circumferential of the engaging hole 31, the hook-like portion 362 of the engaging member 365 engages directly with the engaging hole 31 to achieve the function of mounting the safety guard 5 to the baby seat 1.

When the safety guard 5 needs to be removed form the baby seat 1, the user only needs to press down the operating portion 363 of the engaging member 36 to cause the hook-like portion 362 of the engaging member 365 to pivot toward the inside of the recess 38 of the connecting member 32 and thus disengage the projecting member 311 of the engaging hole 31 of the rear leg tube 3, as shown in FIG. 3b. Then, the second coupling end 322 of the connecting assembly 30 can be removed from the mounting assembly 20 to thereby separating the safety guard 5 from the baby seat 1.

Next, a safety guard mounting/dismounting device according to a second embodiment of the present invention will be described in conjunction with FIGS. 5 to 8.

Figure 5:
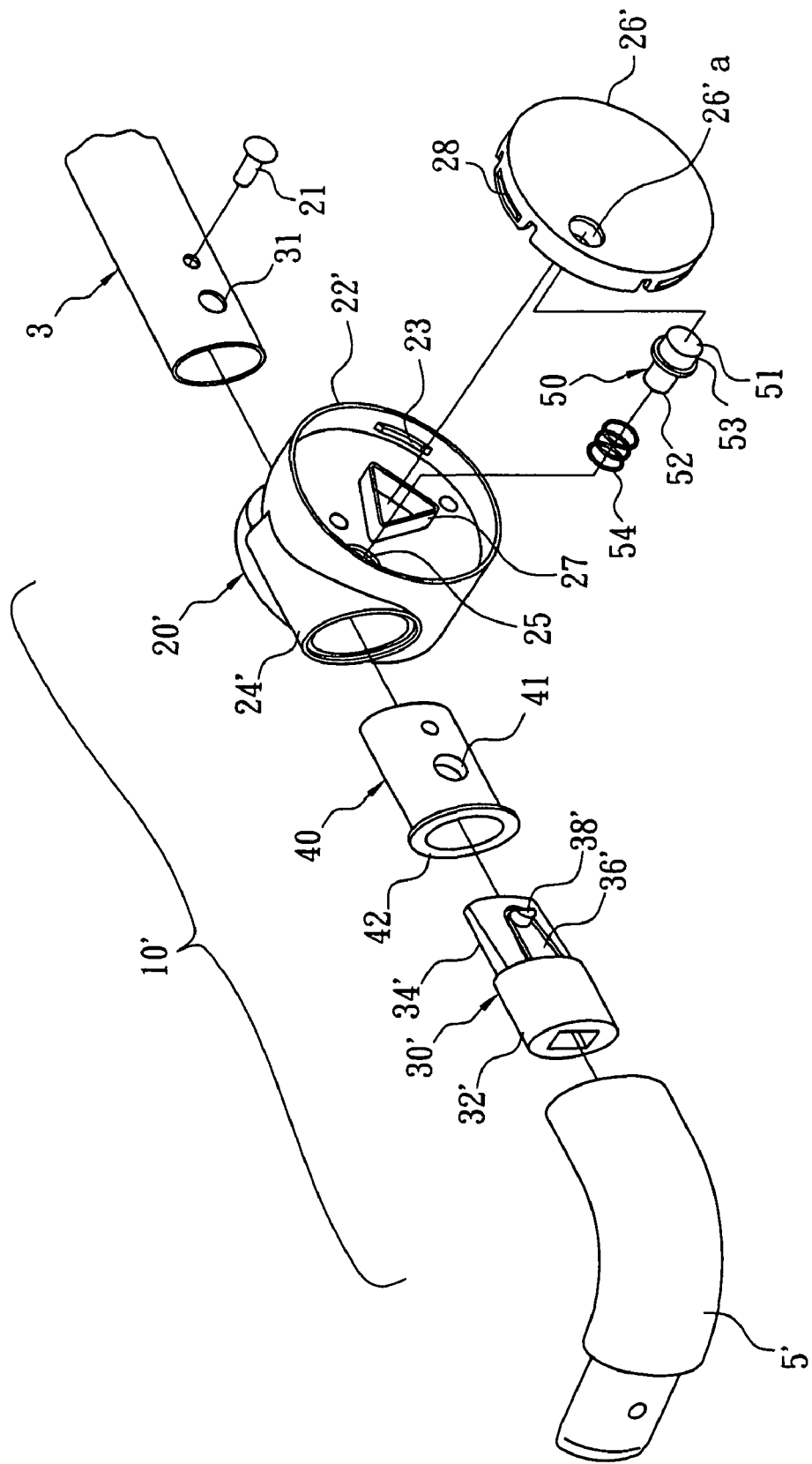
FIG. 5 is an exploded perspective view of the safety guard mounting/dismounting device for a baby seat according to a second embodiment of the present invention.
Figure 6:
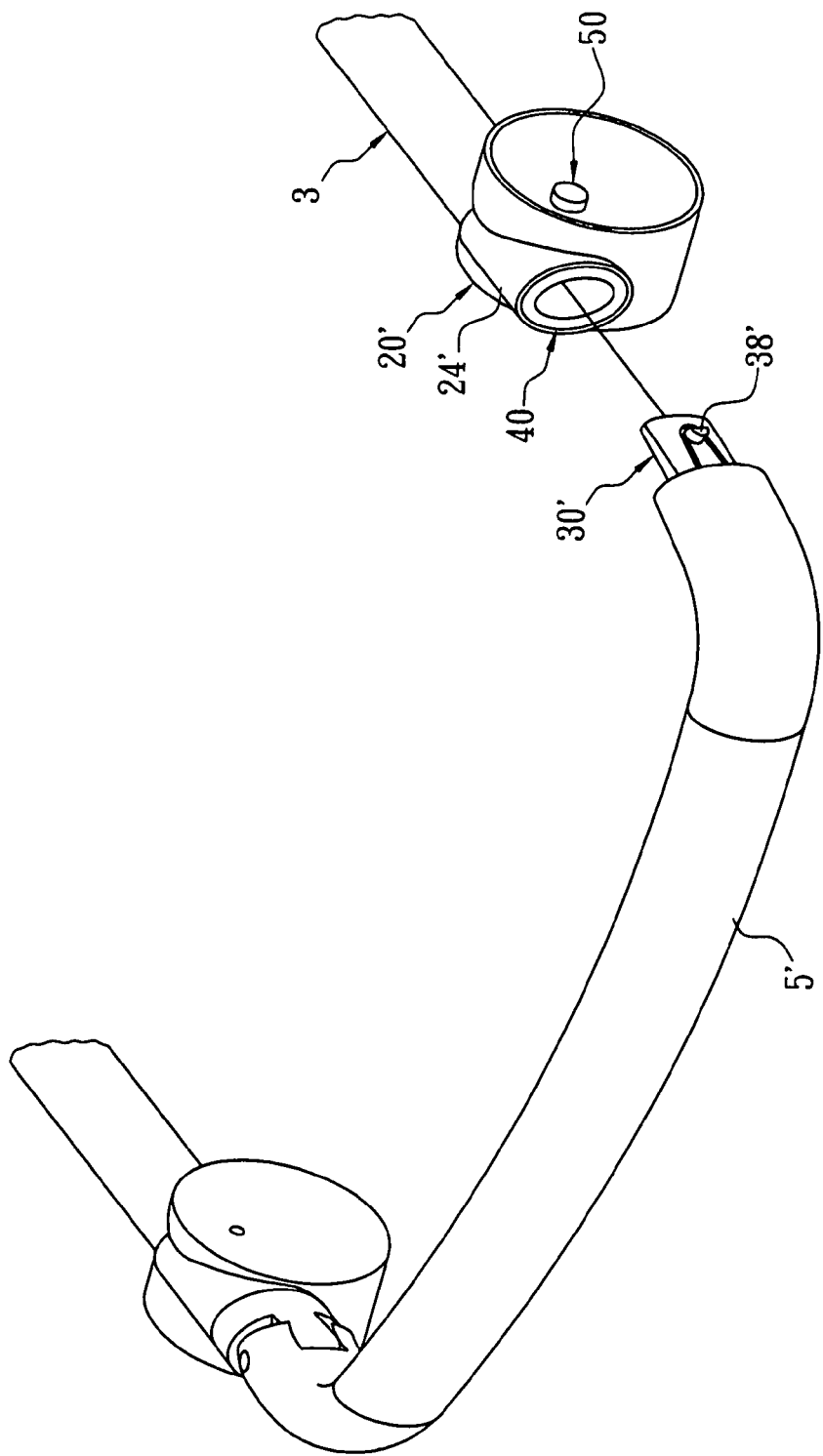
FIG. 6 is an assembled perspective view of the safety guard mounting/dismounting device for a baby seat according to the second embodiment of the present invention.
Figure 7:
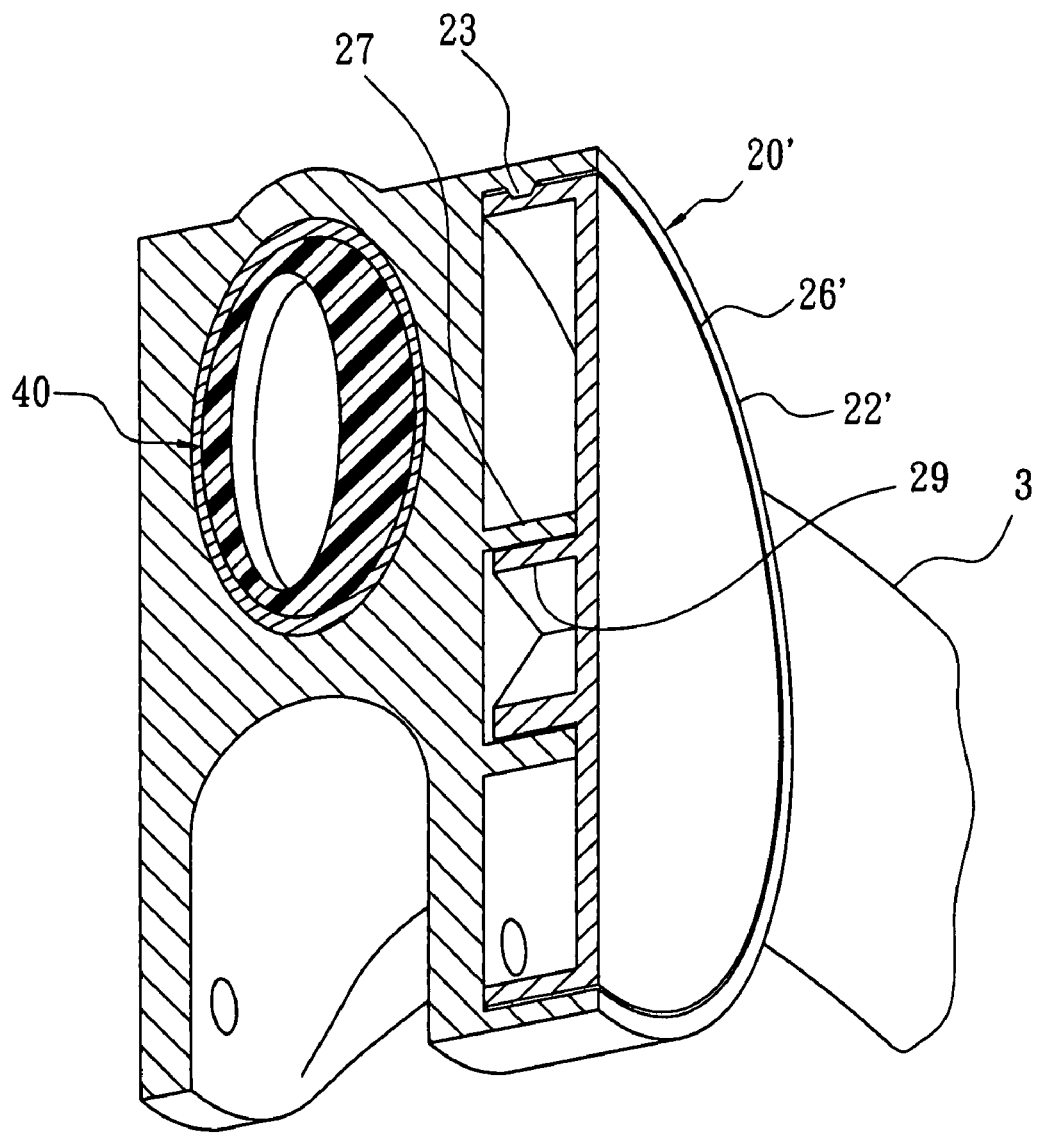
FIG. 7 is a cross-sectional perspective view of the mounting assembly of the safety guard mounting/dismounting device for a baby seat according to the second embodiment of the present invention.

As shown in FIG. 5, the safety guard mounting/dismounting device 10' according to this embodiment mainly comprises a mounting assembly 20', a plug member 40, an operating device and a connecting member 30'. The mounting assembly 20' includes a mounting seat 22' in which a hollow connecting portion 24' is formed for mounting to the rear leg tube 3 of the baby seat 1, and a seat cover 26'. A polygon rib, such as the triangle rib 27 in FIG. 5, is formed on one side surface of the mounting seat 22' at a substantially central position and a through hole 25 in communication with the connection portion 24' is also formed in the same side surface at a position that aligns with the engaging hole 31 of the rear leg tube 3. A circumferential wall is formed at the circumference of the side surface of the mounting seat 22' and at least two engaging ridges 23 (only one is shown in FIG. 5) are formed at an inner side of the circumferential wall. The circumference of the seat cover 26' also formed with a circumferential wall and has at least two engaging slots 28 (only one is shown in FIG. 5) formed in an outer side of the circumferential wall for mating with the at least two engaging ridges 23 to detachably attach the seat cover 26' to the mounting seat 22'. In addition, a structural feature 29 (see FIG. 7) that is sized and shaped to mat with the triangle rib 27 of the mounting seat 22' is formed on a side of the seat cover 26' that faces the mounting seat 22', for preventing the seat cover 26' from rotating relative to the mounting seat 22'. Additionally, a hole 26'a is formed in the seat cover 26' at a position corresponding to the through hole 25 of the mounting seat 22'.

Also shown in FIG. 5, the operating device includes a button 50 which has a head 51, a stem 52, a flange 53 between the head 51 and the stem 52, and a spring coil 54 put around the stem 52 and abutting the flange 53. The button 50 is disposed between the through hole 25 of the mounting seat 22' and the hole 26'a of the seat cover 26 and the stem 52 and the head 51 are sized such that they can pass through the through hole 25 of the mounting seat 22' and the hole 26'a of the seat cover 26 respectively and the flange 53 has a diameter larger than that of the hole 26'a of the seat cover 26 such that the button 50 will not fall out of the hole 26'a, as illustrated in FIGS. 8a and 8b.

The plug member 40 is a hollow tube member sized to be inserted in the rear leg tube 3 and has a flange portion 42 formed at one end thereof for abutting a tube end of the rear leg tube 3 while the plug member 40 is inserted in the rear leg tube 3. In addition, a hole 41 is formed in the tube wall of the plug member 40 at a position corresponding to the engaging hole 31 of the rear leg tube 3 to allow the hole 41 align with the engaging hole 31 of the rear leg tube 3 and the through hole 25 of the mounting seat 22'. The plug member 40 and the mounting seat 22' are fixed to the rear leg tube 3 through a rivet 21, as shown in FIGS. 8a and 8b.

Figure 8A:
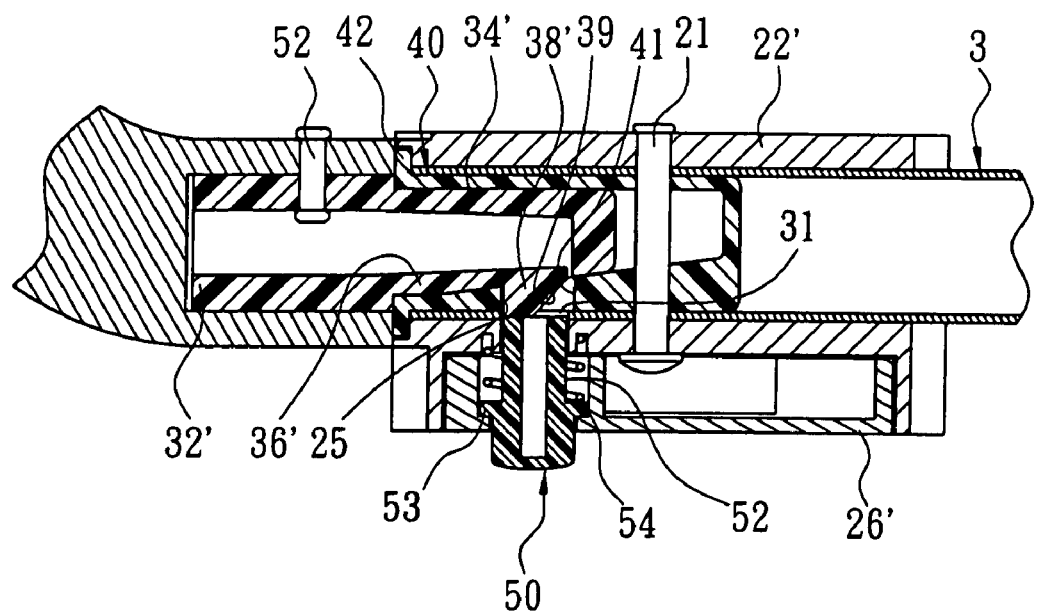
FIGS. 8a and 8b are cross-sectional views illustrating a locked state and an unlocked state of the safety guard mounting/dismounting device according to the second embodiment of the present invention respectively.
Figure 8B:
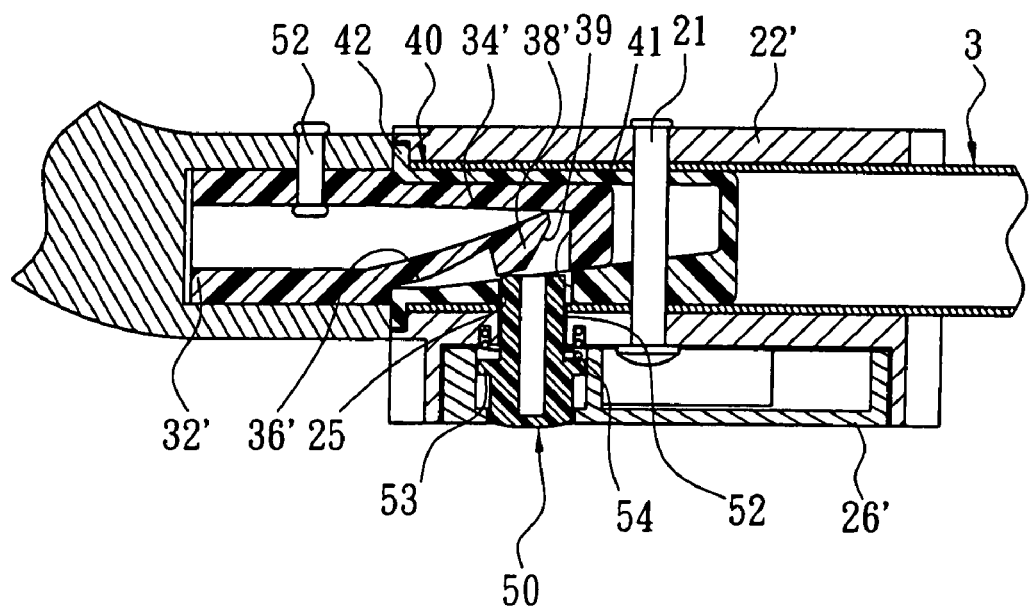

The connecting member 30' is also a hollow tube member and includes a first coupling end 32' that can be inserted into the safety guard 5' and a second coupling end 34' that can be inserted in the plug member 40, wherein the connecting member 30' is fixed to the safety guard 5' through a rivet 56 (see FIGS. 8a and 8b). An elastic arm 36' is formed in a lateral tube wall of the second coupling end 34' facing the hole 41 of the plug member 40. The elastic arm 36' has a fixed end adjacent to the first coupling end 32' and a free end, wherein a protrusion 38' laterally projects from the free end and a reward inclined guide face 39' (see FIGS. 8a and 8b) is formed at a front end of the protrusion 38'. The inherent resiliency of the elastic arm 36' allow the protrusion 38' to be movable between an engaging position and a disengaging position.

In this state, the safety guard 5' with which the connecting 30' is incorporated may be removably mounted to the baby seat 1. Specifically, when the safety guard 5' with which the connecting member 30' needs to be coupled to the baby seat 1, the user may directly insert the connecting member 30' into plug member 40 that is already accommodated in the connecting portion 24' of the mounting assembly 20'. At this time, the protrusion 38' of the elastic arm 36' of the connecting member 30 will project into the hole 41 of the plug member 40 as well as into the engaging hole 31 of the rear leg tube 3, as illustrated in FIG. 8a, so as to mount the safety guard 5' to the baby seat 1.

When the safety guard 5' needs to be removed form the baby seat 1, the user only needs to press down the button 50 of the operating device form the seat cover 26' to cause the stem 52 of the button 50 to push the protrusion 38' of the elastic arm 36' out of the hole 41 of the plug member 40 as well as out of the engaging hole 31 of the rear leg tube 3, as shown in FIG.

8b, and then the connecting member 30' may be pull out of the plug member 40 to detach the safety arm 5' from the baby seat 1.

Although the safety guard mounting/dismounting device of the present invention has been described in the preceding paragraphs by using its application in the baby seat as an example for illustration. It does not imply that the safety guard mounting/dismounting device of the present invention can only be used in the baby seat. On the contrarily, people skilled in this art may find other applications for the safety guard mounting/dismounting device of the present invention, for instance, the safety guard mounting/dismounting device of the present invention may be applied in a stroller. Moreover, It will be apparent to people skilled in this art that many modifications can be made to the disclosed structures without departing from the scope of the invention. Therefore, it is the intent of the appended claims to cover all such variations and modifications as come within the sprit and scope of this invention.

What is claimed is:

1. A safety guard mounting/dismounting device which is mounted to a baby seat, the baby seat having a leg tube, and a safety guard detachably mounted to the leg tube through the safety guard mounting/dismounting device, the safety guard mounting/dismounting device comprising:
    an engaging hole formed in a tube wall of the leg tube;
    a connecting member including a first coupling portion fixed to the safety guard, a second coupling portion removably coupled to the leg tube, and an intermediate portion between the first and the second coupling portions, wherein a recess is formed in the intermediate portion which extends from a place adjacent to the first coupling portion to the second coupling portion;
    a mounting seat which includes a hollow connecting portion for installing to the leg tube and a through hole for aligning with the engaging hole of the leg tube; and
    an engaging device including an engaging member operably disposed in the recess and an elastic element mounted between the engaging member and the connecting member, wherein the engaging member includes a pivoting portion pivotally coupled to the recess at one end adjacent to the first coupling portion and a hook-like portion formed at the other end opposed to the pivoting portion which is pivotally movable between an engaging position and a disengaging position and engages with the engaging hole of the leg tube when the second coupling portion of the connecting member is coupled to the leg tube, and the elastic element is arranged such that the hook-like portion is biased toward the engaging position thereby.

2. A safety guard mounting/dismounting device which is mounted to a baby seat, the baby seat having a leg tube, and a safety guard detachably mounted to the leg tube through the safety guard mounting/dismounting device, the safety guard mounting/dismounting device comprising:
    an engaging hole formed in a tube wall of the leg tube;
    a connecting member including a first coupling portion fixed to the safety guard, a second coupling portion removably coupled to the leg tube, and an intermediate portion between the first and the second coupling portions, wherein a recess is formed in the intermediate portion which extends from a place adjacent to the first coupling portion to the second coupling portion; and
    an engaging device including an engaging member operably disposed in the recess and an elastic element mounted between the engaging member and the connecting member, wherein the engaging member includes a pivoting portion pivotally coupled to the recess at one end adjacent to the first coupling portion and a hook-like portion formed at the other end opposed to the pivoting portion which is pivotally movable between an engaging position and a disengaging position and engages with the engaging hole of the leg tube when the second coupling portion of the connecting member is coupled to the leg tube, and the elastic element is arranged such that the hook-like portion is biased toward the engaging position thereby,
    wherein the recess has two enlarged portions which are laterally expanded from the lateral sides of one end of the recess that is adjacent to the first coupling portion, and the pivoting portion of the engaging member includes two ears that are laterally projected from the lateral sides of the engaging member, and these two ears are disposed in the two enlarged portions of the recess.

3. A safety guard mounting/dismounting device according to claim 2, wherein the connecting member includes a cover which covers a portion of the recess that is at the intermediate portion of the connecting member and has two bulges formed at positions corresponding to the two enlarged portions of the recess.

4. A safety guard mounting/dismounting device according to claim 3, wherein the engaging member has a pressing portion and the cover has a through hole through which the pressing portion may project.

5. A safety guard mounting/dismounting device which is mounted to a baby seat, the baby seat having a leg tube, and a safety guard detachably mounted to the leg tube through the safety guard mounting/dismounting device, the safety guard mounting/dismounting device comprising:
    an engaging hole formed in a tube wall of the leg tube;
    a connecting member including a first coupling portion fixed to the safety guard, a second coupling portion removably coupled to the leg tube, and an intermediate portion between the first and the second coupling portions, wherein a recess is formed in the intermediate portion which extends from a place adjacent to the first coupling portion to the second coupling portion; and
    an engaging device including an engaging member operably disposed in the recess and an elastic element mounted between the engaging member and the connecting member, wherein the engaging member includes a pivoting portion pivotally coupled to the recess at one end adjacent to the first coupling portion and a hook-like portion formed at the other end opposed to the pivoting portion which is pivotally movable between an engaging position and a disengaging position and engages with the engaging hole of the leg tube when the second coupling portion of the connecting member is coupled to the leg tube, and the elastic element is arranged such that the hook-like portion is biased toward the engaging position thereby,
    wherein the engaging hole of the leg tube has a projecting member formed at a portion of its peripheral for engaging with the hook-like portion of the engaging member.

* * * * *